(12) United States Patent
Schumaker

(10) Patent No.: US 11,546,228 B2
(45) Date of Patent: Jan. 3, 2023

(54) ZERO-TOUCH CONFIGURATION OF NETWORK DEVICES USING HARDWARE METADATA

(71) Applicant: Oracle International Corporation, Redwood Shores, CA (US)

(72) Inventor: Robert Thomas Schumaker, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/171,912

(22) Filed: Feb. 9, 2021

(65) Prior Publication Data
US 2022/0217057 A1    Jul. 7, 2022

Related U.S. Application Data

(60) Provisional application No. 63/133,677, filed on Jan. 4, 2021.

(51) Int. Cl.
| | |
|---|---|
| *H04L 41/00* | (2022.01) |
| *H04L 67/06* | (2022.01) |
| *H04L 41/0866* | (2022.01) |
| *H04L 41/0806* | (2022.01) |

(52) U.S. Cl.
CPC .......... *H04L 41/20* (2013.01); *H04L 41/0806* (2013.01); *H04L 41/0866* (2013.01); *H04L 67/06* (2013.01)

(58) Field of Classification Search
CPC . H04L 41/20; H04L 41/0803; H04L 41/0806; H04L 41/0813; H04L 41/0816; H04L 41/0866; H04L 67/06
See application file for complete search history.

(56) References Cited

U.S. PATENT DOCUMENTS

| 6,684,265 B2 * | 1/2004 | Graf .................... G06F 11/0715 |
| | | 700/291 |
| 10,374,872 B2 | 8/2019 | Ratkovic et al. |
| 10,523,504 B1 | 12/2019 | Jain et al. |
| | (Continued) | |

OTHER PUBLICATIONS

Da Rocha Fonseca et al., "Da Rocha Fonseca et al.", Oct. 1, 2017, IEEE Communications Surveys & Tutorials (vol. 19, Issue: 4, pp. 2284-2321) (Year: 2017).*

(Continued)

*Primary Examiner* — Davoud A Zand
(74) *Attorney, Agent, or Firm* — Kilpatrick, Townsend & Stockton, LLP

(57) ABSTRACT

The present is directed to systems, methods, and devices for Zero Touch Provisioning ("ZTP"). The system can include a data center computing network, and at least one server coupled with the data center computing network. The server can receive a trigger signal from a triggering device coupled to a data center hardware network, transmit an executable script to the triggering device, which executable script instructs the triggering device to generate a definition file including a unique identifier of the triggering device, receive the definition file from the triggering device, identify a configuration file associated with the triggering device based at least in part on the unique identifier, and provision the triggering device by delivering the configuration file to the triggering device.

21 Claims, 10 Drawing Sheets

(56) References Cited

U.S. PATENT DOCUMENTS

| | | | | |
|---|---|---|---|---|
| 2004/0083279 | A1* | 4/2004 | Lin | H04W 24/04 709/222 |
| 2015/0341220 | A1 | 11/2015 | Sikand et al. | |
| 2016/0014073 | A1* | 1/2016 | Reddy | H04L 43/16 713/2 |
| 2016/0196124 | A1* | 7/2016 | Vedula | G06F 8/60 717/177 |
| 2018/0102886 | A1* | 4/2018 | Yamada | H04L 1/0005 |
| 2018/0176078 | A1* | 6/2018 | Nigro | H04L 67/10 |
| 2019/0149416 | A1* | 5/2019 | Grevers, Jr. | H04L 41/12 370/254 |
| 2019/0319830 | A1 | 10/2019 | Karam et al. | |
| 2020/0124649 | A1* | 4/2020 | Kagan | G01R 31/55 |
| 2021/0184930 | A1* | 6/2021 | Mutnuru | H04L 41/0886 |
| 2021/0184936 | A1* | 6/2021 | Mutnuru | H04L 41/0813 |

OTHER PUBLICATIONS

Ansible for Network Automation, Available Online at: https://docs.ansible.com/ansible/latest/network/, 2019, 5 pages.

Extreme IP Fabrics Deliver Automated Cloud Data Center Scale and Agility, Extreme, Available Online at: https://cloud.kapostcontent.net/pub/5b7570a4-969a-436b-b37a-cc43cae8b217/ip-fabrics-deliver-automated-cloud-data-center-scale-and-agility-solution-brief.pdf?kui=KKN3E36d4YzK3B2KcYTKag, Accessed from Internet on Jul. 27, 2020, 7 pages.

Terraform, Hashi Corp, Available Online at: https://www.terraform.io/intro/index.html, Accessed from Internet on Jul. 27, 2020, 3 pages.

Brikman, Why We Use Terraform and Not Chef, Puppet, Ansible, Saltstack, or Cloudformation, Available Online at: https://blog.gruntwork.io/why-we-use-terraform-and-not-chef-puppet-ansible-saltstack-or-cloudformation-7989dad2865c, Sep. 26, 2016, 16 pages.

Dolstra et al., Charon: Declarative Provisioning and Deployment, 1st International Workshop on Release Engineering, Available Online at: https://edolstra.github.io/pubs/charon-releng2013-final.pdf, May 20, 2013, 4 pages.

El Maghraoui et al., Model Driven Provisioning: Bridging the Gap Between Declarative Object Models and Procedural Provisioning Tools, Middleware, Conference Paper, Nov. 2006, 20 pages.

* cited by examiner bldg1-block1-group2-rack1 (ad_border_core) RACK [425]
    right: xxx-m1-netpdu5 (XXXX-XXX-XXXXXXX-X-X)
    left: xxx-m1-netpdu6 (XXXX-XXX-XXXXXXX-X-X)
    41: xxx-m1-t0-r3 (XXXX-XXX-XXXXXXX-X-X)
    40: xxx-m1-ts3 (XXXX-XXX-XXXXXXX-X-X)
    16: xxx-x1-y1-r15 (XXXX-XXX-XXXXXXX-X-X)
    15: xxx-x1-y1-r13 (XXXX-XXX-XXXXXXX-X-X)
    14: xxx-x1-y1-r11 (XXXX-XXX-XXXXXXX-X-X)
    13: xxx-x1-y1-r9 (XXXX-XXX-XXXXXXX-X-X)
    12: xxx-x1-y1-r7 (XXXX-XXX-XXXXXXX-X-X)
    11: xxx-x1-y1-r5 (XXXX-XXX-XXXXXXX-X-X)
    10: xxx-x1-y1-r3 (XXXX-XXX-XXXXXXX-X-X)
    9: xxx-x1-y1-r1 (XXXX-XXX-XXXXXXX-X-X)
    8: xxx-x1-y2-r15 (XXXX-XXX-XXXXXXX-X-X)
    7: xxx-x1-y2-r13 (XXXX-XXX-XXXXXXX-X-X)
    6: xxx-x1-y2-r11 (XXXX-XXX-XXXXXXX-X-X)
    5: xxx-x1-y2-r9 (XXXX-XXX-XXXXXXX-X-X)
    4: xxx-x1-y2-r7 (XXXX-XXX-XXXXXXX-X-X)
    3: xxx-x1-y2-r5 (XXXX-XXX-XXXXXXX-X-X)
    2: xxx-x1-y2-r3 (XXXX-XXX-XXXXXXX-X-X)
    1: xxx-x1-y2-r1 (XXXX-XXX-XXXXXXX-X-X)

*FIG. 2*

ZERO-TOUCH CONFIGURATION OF NETWORK DEVICES USING HARDWARE METADATA

CROSS REFERENCE

This application claims benefit of U.S. Provisional Patent Application No. 63/133,677, filed Jan. 4, 2021, and entitled "Zero-Touch Configuration Of Network Devices Using Hardware Metadata", the entirety of which is hereby incorporated by reference herein.

TECHNICAL FIELD

The present disclosure relates generally to data transmission in and/or to a cloud network.

BACKGROUND

Data centers play an important role in modern software technology. Data centers frequently employ multiple servers connected interconnected via a switch architecture. Via this switch architecture, the servers are able to communicate with each other, as well as communicate with devices outside of the data center.

Such switch architectures have evolved and improved over time. Some of these improvements have included a change in architecture from tree architectures to more modern, spine-and-leaf architectures. These modern architectures provide significant benefits, including decreased and consistent latency.

These improvements in data center architecture have been driven, in part, by ever increasing needs for processing capability and increased processing speeds. Increasing processing demands have resulted in the growth of data centers, and specifically in the growth in the number of servers a switches forming the data center.

With the increase in desired processing capacity have come concomitant increases in network connectivity and shortened time-to-market. The standard network neighbor driven configuration patterns, which work well in stable network environments, do not converge when applied to a just-built network with missing and untested cabling. Due to these changes, further improvements to the creation, control, and operation of data centers are desired.

BRIEF SUMMARY

The present disclosure relates generally to Zero Touch Provisioning ("ZTP"). One aspect of the present disclosure relates to a method including receiving, by a server, a trigger signal from a triggering device coupled to a data center hardware network, the triggering device including an unprovisioned component within the data center hardware network, transmitting, by the server, an executable script to the triggering device, the executable script can instruct the triggering device to generate a definition file including a unique identifier of the triggering device, receiving, by the server, the definition file from the triggering device, identifying, by the server, a configuration file associated with the triggering device based at least in part on the unique identifier, and provisioning the triggering device by delivering, by the server, the configuration file to the triggering device.

In some embodiments, the data center hardware network can be a Clos network. In some embodiments, the data center hardware network can have a spine-and-leaf architecture. In some embodiments, the unique identifier of the triggering device can be a serial number. In some embodiments, the executable script can instruct the triggering device to identify neighboring devices. In some embodiments, the definition file includes information identifying neighboring devices of the triggering device. In some embodiments, the information identifying neighboring devices of the triggering device includes at least one of: a serial number of a neighboring device; and wiring port information.

In some embodiments, the method includes determining that the triggering device is correctly wired. In some embodiments, determining that the triggering device is correctly wired includes: comparing the identified neighboring devices to a set of expected neighboring devices for the triggering device; and identifying the triggering device as properly wired when the identified neighboring devices match the set of expected neighboring devices. In some embodiments, the method includes delivering a message indicating that the triggering device is correctly wired.

In some embodiments, the method includes determining that the triggering device is incorrectly wired. In some embodiments, determining that the triggering device is incorrectly wired includes: comparing the identified neighboring devices to a set of expected neighboring devices for the triggering device; and identifying the triggering device as improperly wired when at least one of the identified neighboring devices does not match the set of expected neighboring devices. In some embodiments, the method includes delivering a message indicating that the triggering device is incorrectly wired.

In some embodiments, the trigger signal received from the triggering device includes a request for a network address, which request for the network address is received by the server. In some embodiments, the server can be a Dynamic Host Configuration Protocol ("DHCP") server. In some embodiments, the DHCP server receives the request for the network address. In some embodiments, transmitting by the server the executable script to the triggering device includes: allocating a network address for the triggering device, and providing the allocated network address to the triggering device.

One aspect of the present disclosure relates to a non-transitory computer-readable storage medium storing a plurality of instructions executable by one or more processors. In some embodiments, the plurality of instructions when executed by the one or more processors cause the one or more processors to receive a trigger signal from a triggering device coupled to a data center hardware network, the triggering device including an unprovisioned component within the data center hardware network, transmit an executable script to the triggering device, the executable script can instruct the triggering device to generate a definition file including a unique identifier of the triggering device, receive the definition file from the triggering device, identify a configuration file associated with the triggering device based at least in part on the unique identifier, and provision the triggering device by delivering the configuration file to the triggering device.

In some embodiments, identifying the configuration file associated with the triggering device based at least in part on the unique identifier includes querying a database for the configuration file designated for the triggering device, and returning the configuration file in response to the query of the database. In some embodiments, the database links a device unique identifier to a location and to a configuration file.

One aspect of the present disclosure relates to a system. The system can include a data center hardware network having at least one switch, and at least one server communicatively coupled with the data center hardware network. In some embodiments, the at least one server is can receive a trigger signal from a triggering device coupled to a data center hardware network, the triggering device including an unprovisioned component within the data center hardware network, transmit an executable script to the triggering device, the executable script can instruct the triggering device to generate a definition file including a unique identifier of the triggering device, receive the definition file from the triggering device, identify a configuration file associated with the triggering device based at least in part on the unique identifier, and provision the triggering device by delivering the configuration file to the triggering device.

In some embodiments, the executable script can instruct the triggering device to identify neighboring devices. In some embodiments, the definition file further includes information identifying neighboring devices of the triggering device.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

BRIEF DESCRIPTION OF THE DRAWINGS

FIG. 2 is a depiction of one embodiment of one embodiment of rack information.

DETAILED DESCRIPTION

Figure 1:
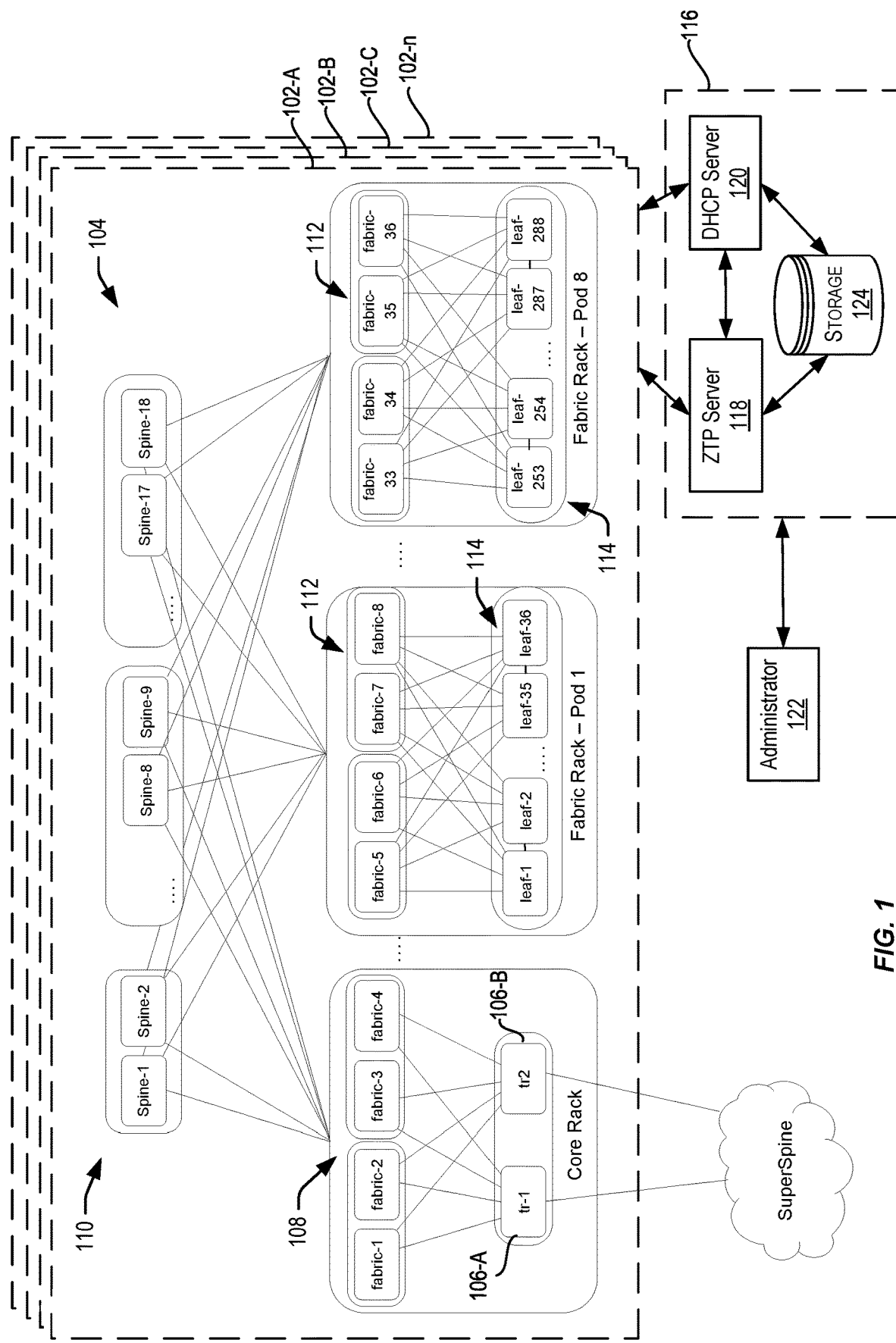
FIG. 1 depicts a schematic illustration of one embodiment of a network system.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A cloud services provider (such as Oracle Corporation of Redwood Shores, Calif.) may provide one or more cloud services that can be subscribed to by customers (or subscribers) of the offered services. In order to provide these services, the cloud services provider may run thousands of applications in its cloud infrastructure. These thousands of applications may be executed by hundreds (or even more) of servers and the applications and servers need to communicate and exchange data with each other in the provision of the cloud services. As part of its cloud infrastructure, a cloud services provider thus has to build a robust and scalable network (or multiple networks) that are scalable and provide seamless experience to the subscribers for the applications. For example, it is desired that such a network support application ("app") continuity, application fluency, application optimization, and the like.

Such networks are generally quite complex with potentially hundreds, or thousands, or even more components. A typical cloud network for a cloud services provider comprises multiple routers and switches that are responsible for routing and handling of traffic between applications executed by servers within the infrastructure of the cloud services provider. The servers may be spread across one of more data centers. These applications may include applications that are accessed by subscribers (clients) of the cloud services.

Clos topology-based networks are currently commonly used by cloud service providers to implement their networks. A Clos network is a multi-tiered network (e.g., 2-tiered, 3-tiered, etc.) comprising of multiple devices organized into tiers or layers. Each tier comprises one or more switches or routers. Switches, routers, and devices are used interchangeably herein in the context of the computing network. Thus, a "device" in the computing network can be a switch or router. A Clos network specifies a hierarchy of devices connected to backend servers that may be executing the applications. Clos networks are popular because they offer deterministic or informed latency all the way from where the packet enters the network from a server to when it leaves the network. A Clos network also offers redundancy and high availability.

A 3-tiered Clos network may include:
(1) An edge layer as described above.
(2) An aggregation layer as described above.
(3) A fabric layer comprising fabric devices. A fabric layer generally sits between the edge layer and the aggregation layer (i.e., provides connectivity between leaf devices of the edge layer and the spine devices of the aggregation layer). In certain configurations, fabric devices may also be connected to one or more transit routers ("TR") that provide connectivity between availability domains. A leaf device may be connected to one or more fabric devices. The fabric layer increases the scalability of a Clos network. For example, in a particular setup, leaf devices may have 10 Gig ports and fabric devices may have 40 Gig ports. In this setup, four leaf device ports or interfaces can be connected to one fabric device port. A fabric device may be connected to one or more spine devices.

In a 3-tiered Clos network, for communication between servers (e.g., between applications executed by the servers) in an availability domain ("AD"), a packet originating from a source server (e.g., originating from an application executed by the source server) may be received by a leaf device (of the ingress stage) connected to the source server.

The ingress stage leaf device may then forward the packet to an appropriate fabric device, which may in turn forward the packet to a spine device. The spine device may then forward the packet to a fabric device, which in turn forwards the packet to an egress stage leaf device. The egress stage leaf device may then forward the packet to a server that is executing an application that is the intended destination of the packet.

For example, a cloud services provider may have cloud infrastructure in a particular region (e.g., San Jose). The infrastructure may spread across multiple buildings and multiple floors of a building. Each building may represent an AD. Within a building, each floor of the building may host a subset of the cloud applications, and a floor may communicate with another floor using DCI spine devices. One building may talk to another building via a transit router (TR). Within an AD (i.e., within a building) a Clos network may be set up and used for enabling communications and data exchanges between servers in that building.

The setting up and management of cloud networks (e.g., Clos networks) is a difficult, tedious, and time consuming process because the setting up and management tasks are currently done manually. For each network, components of the network generally have to be individually configured and/or provisioned. For example, each leaf device has to be configured including allocating a host name to the leaf device that is recognizable by DNS (Domain Name Server) and DHCP (Dynamic Host Configuration Protocol) (e.g., hostname.oracle.com), specifying VLANs, IP addresses, VRFs (virtual routing and forwarding), interfaces, etc. The information stored and used by the DNS and DHCP servers also has to be updated for each device. As the size and scale of a cloud network increases or changes, network set-up and management becomes a big headache. For example, imagine having to configure and manage a network comprising thousands or even more of devices in a Clos network. To further complicate matters, the individual devices, for example, the leaf devices can be from different vendors with each vendor having its own unique way of configuring its devices. A network administrator thus has to learn all these different ways of configuring devices for different vendors.

As described herein, techniques are described for automating provisioning and/or configuration of devices within the computing network. This can include a new technique for Zero Touch Provisioning ("ZTP"), for provisioning devices and/or switches in the computing network without human intervention. In some embodiments, the ZTP disclosed herein is not network device vendor specific, and does not require MAC addresses for all of the ports on the devices. This ZTP can be performed for some or all devices within all or portions of the computing network, including, in some embodiments, all of a computing network of an availability domain. This ZTP can include accessing a database cross-linking asset management information tracking, for example, devices and their physical location with configuration files for those devices. This can include one or several asset management databases that can include a set of unique device identifiers, also referred to herein as asset identifiers, each of which unique asset identifiers can be associated with a physical location such as a position or slot within, for example, a server rack, and at least one associated configuration file of that device. The ZTP can include receiving the unique device identifier from a triggering device and delivering the associated configuration file to that triggering device. In some embodiments, the triggering device is a device within the computing network that is triggering the ZTP process to become provisioned. The triggering device can trigger the ZTP process upon being powered up.

In some embodiments, the ZTP can further perform an evaluation of cabling accuracy for that triggering device. Specifically, based on the unique device identifier, the ZTP process can identify one or several expected neighbor devices and/or connections with those one or several neighbor devices. The ZTP can receive information from the triggering device identifying actual neighbor devices and/or connections with those actual neighbor devices and can compare the information identifying actual neighbor devices and/or connections with expected neighbor devices and/or connections. Discrepancies between actual and expected neighbor devices and/or connections can be flagged, and a message can be generated and/or delivered identifying incorrect cabling based on these inconsistencies.

Thus, instead of using information identifying neighboring devices to identify a configuration file for the triggering device, the configuration file can be identified based, at least in part, on a unique identifier of that triggering device. Further, based on the identification of that triggering device, cabling and/or neighboring devices of the triggering device can be evaluated to determine whether the triggering device is properly connected within the computing network.

FIG. 1 is a schematic illustration of one embodiment of a network system 100. The network system 100 can comprise one or several computing networks 102. In some embodiments, these computing networks can be data center hardware network. In some embodiments, these computing networks can be arranged into one or several units such as, for example, one or several realms, regions, availability domains, or the like. In some embodiments, an availability domain can comprise one or several computing networks 102. Some or all of the computing networks 102 comprising a network of devices 104. In some embodiments, the network of devices 104 can comprise a 3-tiered Clos network having a spine-and-leaf architecture as depicted in FIG. 1. The embodiment of FIG. 1 is an exemplary embodiment, and the present disclosure is not limited to the details of FIG. 1, but can include, for example, more or fewer computing networks 102, more or fewer tiers within the network of devices 104, more or fewer devices within the tiers of the network devices 104 and/or in the network of devices 104.

The network of devices 104 includes transit routers 106-A, 106-B. The network of devices 104 can include any desired number of transit routers 106 including, for example, 1 transit router 106, 2 transit routers 106, 3 transit routers 106, 4 transit routers 106, 5 transit routers 106, 10 transit routers 106, 20 transit routers 106, 50 transit routers 106, 100 transit routers 106, 200 transit routers 106, 500 transit routers 106, between 1 and 20 transit routers 106, between 20 and 100 transit routers 106, between 100 and 500 transit routers, and/or any other or intermediate number of transit routers 106. The transit routers 106 can be connected via first fabric devices 108 to spine devices 110, which spine devices 110 can be connected via second fabric device 112 to leaf devices 114.

One or several computing networks 102 are connected with server 116. Server 116 can comprise one or several servers and can administer and/or manage the one or several computing networks 102. In some embodiments, the server 116 can be configured to provision one or several devices within the network of devices 104. The server 116 can, as depicted in FIG. 1, include: ZTP server 118; DHCP server 120; administrator device 122; and storage 124. In some embodiments, server 116 can further include a DNS server. In some embodiments, the DNS server can maintain one or several IP address tables.

The ZTP server 118 can be a component, embodied in hardware or software, which can be communicatively coupled to one or several of the computing networks 102. In some embodiments, the ZTP 118 can be embodied as one or several computing devices and/or servers that are communicatively coupled to one or several of the computing networks 102. In embodiments in which the ZTP 118 is embodied in software, ZTP 118 can be one or several applications. The ZTP 118 can provide network device provisioning, specifically, ZTP server 118 can identify and provide (e.g., download) a configuration file to a network device within the computing network 102 based on information received from that network device.

The DHCP server 120, which can, in some embodiments, operate according to DHCP or according to BOOTSTRAP Protocol ("BOOTP"). In some embodiments, the DHCP server 120 can be embodied in hardware or software and can be communicatively coupled to the one or several computing networks 102. In some embodiments, the DHCP server 120 can be communicatively coupled to devices within the one or several computing networks 102. The DHCP server 120 can communicate with the one or several computing networks 102 and/or devices therein according to DHCP to assign network addresses, and specifically to assign Internet Protocol ("IP") addresses.

The administrator device 122 can be any computing device via which a person can interact with the server 116. This administrator device 122 can be part of server 116, or can be communicatively coupled to the server 116. The administrator device 122 can include a user interface via which the user can receive information from the administrator device 122 and provide information to the administrator device 122. In some embodiments, this information can include one or several messages indicating: successful/unsuccessful provisioning of a triggering device, cabling accuracy/inaccuracy; and any incorrect connections between the triggering device and one or several neighbor devices.

The network system 100 can include storage 124, which storage can be part of server 116 or can be separate from server 116. The storage can comprise memory, and specifically can comprise any desired type or form of memory. In some embodiments, the storage 124 can comprise one or several databases including, for example, an asset management database, also referred to herein as an asset database, a network database, and/or a configuration file database. In some embodiments, each device in the computing network 102 can have a unique configuration file, and in some embodiments, a plurality of devices in the computing network 102 can share a common configuration file. In some embodiments in which each device in the computing network has a unique configuration file, the asset management database can comprise link between a unique identifier of one device in the computing network 102 and a configuration file. In some embodiments in which a plurality of devices share a common configuration file, a unique identifier for each of the devices sharing a common configuration file can be separately linked to the configuration file, and in some embodiments in which a plurality of devices share a common configuration file, a set of unique identifiers of devices sharing a common configuration file can be linked to that common configuration file.

In some embodiments, this link between the unique identifier(s) of the device(s) can be a direct link via a pointer from the unique identifier(s) to the configuration file or to an identifier of the configuration file. In some embodiments, this link between the unique identifier(s) of the device(s) can be an indirect link via a pointer from the unique identifier to one or several physical locations, which one or several physical locations can be linked via a pointer to the configuration file or to an identifier of the configuration file. In some embodiments, these physical locations can comprise, for example, a position within a server rack, such as, for example, a slot within a server rack.

In some embodiments, the asset management database can include rack information for each server rack in the computing network 102. One embodiment of rack information 200 is shown in FIG. 2. As seen, the rack information 200 can include information identifying a rack name 202 and rows 204 of information identifying devices and locations, such as position and/or slot within the server rack. This device information identifying devices can include a unique identifier 206 of a device. This unique identifier can be, for example, a serial number, a Media Access Control ("MAC") address, or the like. In some embodiments, and as discussed above, this information can be linked to configuration files, such that a configuration file is associated, either directly or indirectly, with each of the unique device identifiers 206, and/or with the locations of the devices.

The storage 124 can further comprise a network database. The network database can comprise information enabling identification of neighbor information for a device within the computing network 102. This includes, for example, information that, upon identification of the device within the computing network 102, enables identification of anticipated neighbor devices within the computing network 102, and/or identification of cabling connections with neighbor devices within the computing network 102.

Figure 3:
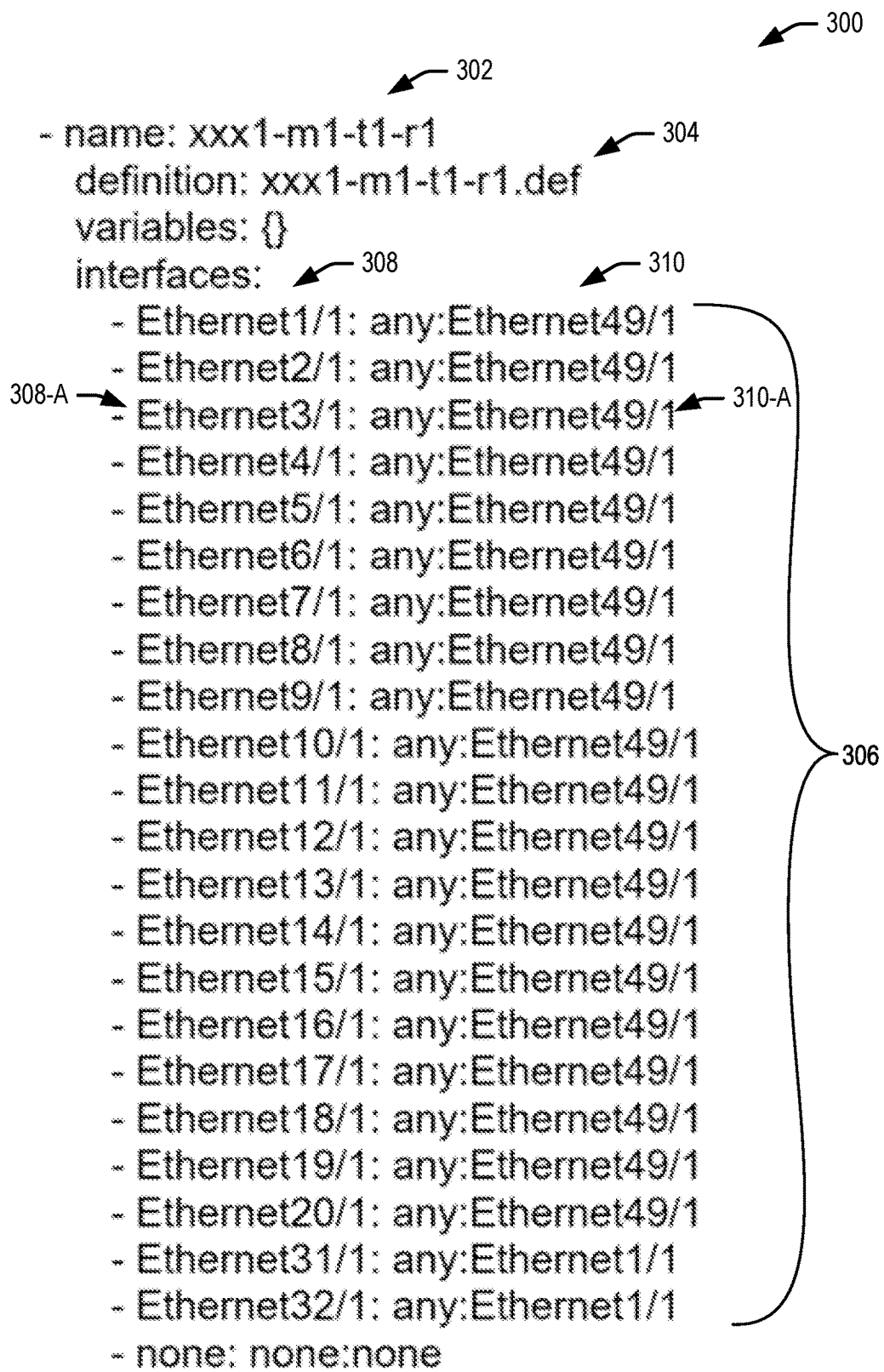
FIG. 3 is a depiction of one embodiment of device map information.

In some embodiments, the network database can include a network map. This network map can include device map information 300 for each device within the computing network 102 such as shown in FIG. 3. The device map information 300 can include a device name 302 for the device to which the device map information 300 is applicable. In some embodiments, this device name 302 can be the unique identifier 206 of the device. The device map information 300 can further include the identification of a definition file 304, and in some embodiments, a pointer or a link to that definition file. The definition file can be information gathered from the device with which the device map information 300 is associated. This information can include, for example, metadata gathered from the device such as, for example, the unique device identifier 206 as gathered from the device, and neighbor information gathered by the device.

The device map information 300 can further include a plurality of rows 306 identifying interfaces connecting to the device. This interface information can include information identifying interfaces 308, also referred to herein as ports 308, of the device associated with the device map information 300 and identifying the interface 310, also referred to herein as port 310 of the neighbor device to which the device associated with the device map information 300 is coupled. In some embodiments, each of the rows 306 can further include information identifying the neighbor device to which the device associated with the device map information 300 is coupled. Thus, a row would include: (1) the port 308-A, identified in FIG. 3 as "Ethernet 3/1", of the device associated with the device map information 300; (2) identification of the neighbor device coupled to the port 308-A of the device associated with the device map information 300; and (3) identification of the port 310-A, identified in FIG. 3 as "Ethernet 49/1", of the neighbor device coupled to the port 308-A of the device associated with the device map information 300. In some embodiments, use of the device map information 300 can enable the evaluation of cabling and/or the neighbor devices of the device associated with the device map information 300.

The storage 124 can further comprise a configuration file database. The configuration file database can comprise the configuration files, or pointers to the configuration files. In some embodiments, the configuration database can be incorporated into, for example, asset management, and in some embodiments, the configuration database can be a distinct database. In some embodiments, the configuration file for a device can be coupled to, for example, the unique identifier 206 of that device. In some embodiments, the configuration file for a device can be coupled to the device map information for that device. This coupling can be, for example, via one or several pointers.

Figure 4:
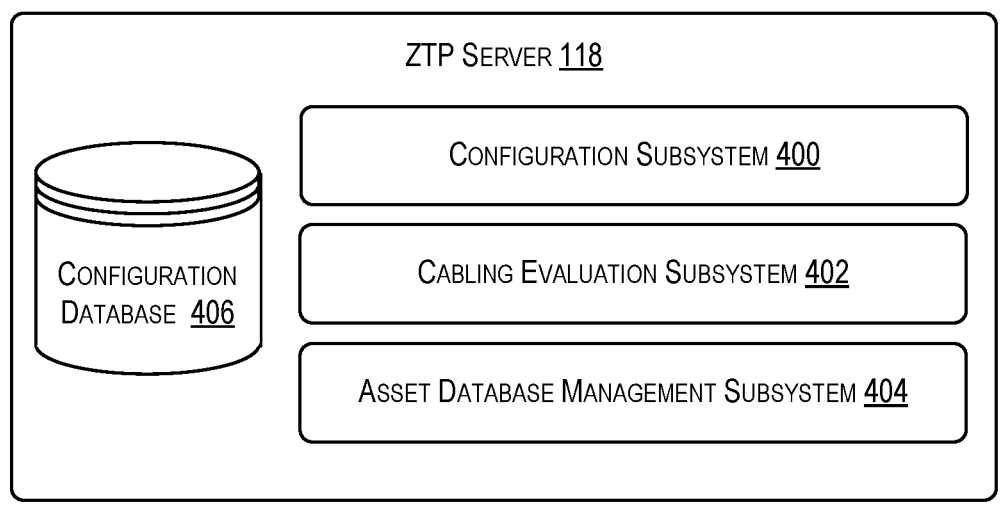
FIG. 4 is a schematic illustration of one embodiment of the ZTP server.

With reference now to FIG. 4, a schematic illustration of one embodiment of the ZTP server 118 is shown. The ZTP server 118 can include, a configuration subsystem 400, a cabling evaluation subsystem 402, and an asset database management subsystem 404. In some embodiments, the ZTP server 118 can further include a configuration database 406.

The configuration subsystem 400 can be configured to interact with the triggering device, and specifically to receive messages from the triggering device and send messages to the triggering device. These messages can include a request for a configuration file and delivery of the configuration file. In some embodiments, the configuration subsystem 400 can be further configured to interact with other subsystems 402, 404, 406 of the ZTP server 118. In some embodiments, for example, the configuration subsystem 400 can interact with the storage 124 and/or with the configuration database 406 to retrieve the configuration file for the triggering device.

The cabling evaluation subsystem 402 can be configured to evaluate cabling of the triggering device, or in other words, to determine if the triggering device is directly coupled to a correct set of other devices within the computing network 102. As used herein, a neighbor device is a device directly coupled with the triggering device. Two devices are directly coupled when they are coupled without any intermediate device. The cabling evaluation subsystem 402 can evaluate cable of the triggering device by comparing information received from the triggering device identifying neighbor devices to information identifying expected neighbor devices. This can include receiving identification information for the triggering device, retrieving the device map information 300 for the triggering device, receiving actual neighbor device information for the triggering device, which information can be contained in a definition file generated by the triggering device, and comparing the actual neighbor device information with expected neighbors identified in the device map information 300. A discrepancy between the expected and the actual neighbor devices can be flagged by the cabling evaluation subsystem 402, and the cabling evaluation subsystem 402 can generate and/or send a message identifying this discrepancy.

The asset database management subsystem 404 can be configured to maintain the configuration database 406, which configuration database 406 can contain configuration files. In some embodiments, the asset database management subsystem 404 can generate links between configuration files and unique device identifiers.

Figure 5:
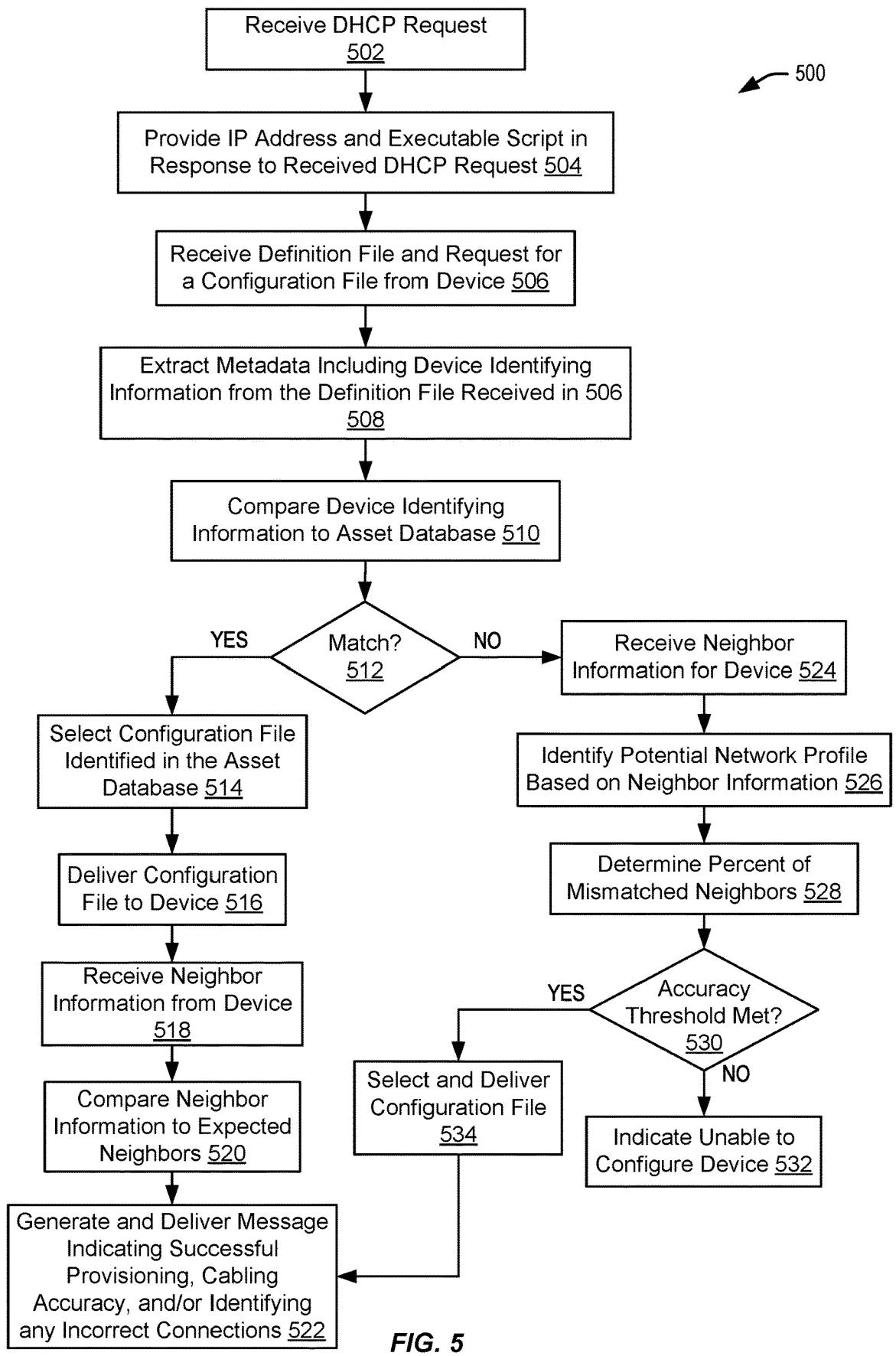
FIG. 5 is a flowchart illustrating one embodiment of a process for provisioning a device within a network.

With reference now to FIG. 5, a flowchart illustrating one embodiment of a process 500 for provisioning is shown. The process 500 can be performed by all or parts of the network system 100. In some embodiments, the process 500 can be performed by the server 116, and specifically by one or both of the ZTP server 118 and the DHCP server 120.

The process 500 begins at block 502, wherein a DHCP request is received. In some embodiments, the DHCP request can comprise a triggering signal that can be received by the server 116 and in some embodiments, the triggering signal can be received by DHCP server 120. In some embodiments, this signal from the triggering device, which triggering device can be an unprovisioned component within the computing network 102, can be sent subsequent to the powering up of the triggering device. In some embodiments, the triggering device can power on when the triggering device is added to the computing network 102 or is rebooted. In some embodiments, the trigger device can be added to the computing network 102, via the insertion of the trigger device into a gap in a preexisting computing network 102. This gap can occur, for example, when a previous device is removed from a computing network 102. Alternatively, in some embodiments, the trigger device can be power on as a part of the creation of a new computing network 102.

In some embodiments, this triggering signal can comprise a request for a network address, such as a request for a network address according to a DHCP protocol. In some embodiments, for example, this request can comprise a DHCPDISCOVER message broadcast by the triggering device and received by the server 116, and specifically by the DHCP server 120. The server 116, and specifically the DHCP server 120, upon receiving the DHCP request can provide a network address, which can be, for example, an Internet Protocol address ("IP address"), and an executable script to the triggering device in response to the received request of block 502. In some embodiments, the DHCP server 120 can, as a part of block 504, reserve an IP address for the triggering device, and offer the reserved IP address to the triggering device. Upon receipt of a request for the reserved IP address from the triggering device, the DHCP server 120 can acknowledge the DHCP request from the triggering device and send a message, DHCPACK, to the triggering device that includes the assignment of the IP address and the executable script, which executable script can be sent in the form of an option file.

This executable script can be configured to instruct the triggering device to generate a definition file. This definition file can include metadata of the triggering device such as, for example, one or several unique identifiers of the triggering device, one or several hardware capabilities and/or configurations of the triggering device, neighbors of the triggering device, or the like. In some embodiments, this unique identifier can be, for example, a serial number of the triggering device such as, for example, a serial number assigned to the triggering device by the manufacturer of the triggering device. In some embodiments, metadata identifying neighbors of the triggering device can include, for example, a serial number for some or all of the neighbor devices of the triggering device, and/or wiring port information.

In some embodiments, this executable script can be configured to instruct the triggering device to generate and/or determine this metadata. Specifically, the executable script can, in some embodiments instruct the triggering device to, for example, determine one or several unique identifiers of the triggering device, to identify neighbors of the triggering device and/or connections with neighbors of the triggering device, and/or determine one or several hardware attributes or configurations of the triggering device. In some embodiments, the executable script can instruct the triggering device to exchange messages via a communication protocol to identify neighbor devices. This communication protocol can include, for example, Link Layer Discovery Protocol ("LLDP").

At block 506, the server 116 receives the definition file from the triggering device. In some embodiments, this can include receiving a request for a configuration file for the triggering device. In some embodiments, the definition file can be received in the same message as the request for the configuration file, and in some embodiments, the definition file and the request for the configuration file can be received in different messages. In some embodiments, the definition file and/or the request for the configuration file can be received by the ZTP server 118.

Metadata can be extracted from the message file by the server 116, and in some embodiments by the ZTP server 118. This extracted metadata can include, for example, information identifying the triggering device such as the unique device identifier, information identifying neighbor devices and/or connections with the neighbor devices, and/or information identifying one or several attributes and/or configurations of the triggering device.

After the metadata has been extracted from the configuration file, the process 500 proceeds to block 510, wherein information identifying the triggering device is compared to information in a memory such as storage 124 and/or database. In some embodiments, this can result in the server 116, and specifically the ZTP server 120 identifying a configuration file associated with the triggering device based at least in part on the unique identifier of the triggering device. In some embodiments, this comparison can comprise a querying the memory and/or the database with the device identifying information. In some embodiments, this can include querying the memory and/or database for whether the unique identifier is linked, either directly or indirectly with a configuration file, and/or querying the memory and/or database for the configuration file associated with the device identifying information. In some embodiments, this can include the configuration subsystem 400 of the ZTP server 118 querying the asset management database. The queried memory and/or database can return a response to the query. In some embodiments, the delivery of the response to the query can comprise returning a configuration file associated with the device identifying information in response to the query. If, as indicated in decision step 512, a configuration file matching the device identifying information is identified and/or returned, the process 500 can proceed to block 514, wherein the identified configuration filed is selected, and then the block 516, wherein triggering device is provisioned via the delivery and/or downloading of the selected configuration file to the triggering device. In some embodiments, the selected configuration file can be delivered and/or downloaded to the triggering device by the server 116, by the ZTP server 118, by the memory 124, and/or by the configuration database 406.

At block 518 neighbor information is received by the server 116, and in some embodiments, can be received by the ZTP server 120, from the triggering device. In some embodiments, this neighbor information can be received in the definition file received in block 506, and in some embodiments, this neighbor information can be received via a separate message.

After the neighbor information has been received, the process 500 proceeds to block 520. At step 520, it is determined whether the triggering device is correctly wired, or in other words, it is determined whether the triggering device is connected to the correct neighbor devices. In some embodiments, this can include, for example, comparing the neighbor information received in block 518 to expected neighbor information for the triggering device. In some embodiments, this comparison can be performed by the server 116, specifically by the ZTP server 118, and more specifically by the cabling evaluation subsystem 402 of the ZTP server 118. In some embodiments, this comparison of actual neighbor information to expected neighbor information can comprise retrieving the network map information for the triggering device from the network database, and identifying expected neighbors from the network map information for the triggering device. These expected neighbors can be compared to actual neighbors identified in the neighbor information received in block 518. In some embodiments, this can include comparing unique identifiers of actual neighbor devices to unique identifiers of expected neighbor devices, and in some embodiments, this can include comparing expected connections of interfaces and/or ports of the triggering device and one or several neighbor devices with actual connections of interfaces and/or ports of the triggering device and one or several neighbor devices.

In some embodiments, this comparing can include determining that the triggering device is correctly wired. This can include, for example, comparing the neighboring devices identified in the neighbor information received in block 518 to the set of expected neighboring devices for the triggering device identified in the network map information for the triggering device, and identifying the triggering device as properly wired when the identified neighboring devices match the set of expected neighboring devices. In some embodiments, this comparing can include determining that the triggering device is incorrectly wired. This can include, for example, comparing the neighboring devices identified in the neighbor information received in block 518 to the set of expected neighboring devices for the triggering device identified in the network map information for the triggering device, and identifying the triggering device as improperly wired when at least one of the identified neighboring devices does not match the set of expected neighboring devices.

After the comparing of expected to actual neighbor devices, the process 500 proceeds to block 522, wherein a message is generated and/or delivered. This message can indicate the successful completion of provisioning of the triggering device, or in other words, the successful identification and delivery of a configuration file for the triggering device. In some embodiments, this message can further indicate the cabling accuracy, or in other words, the accuracy of the connection of the triggering device to neighbor device(s). In some embodiments, if this message indicates an inaccuracy, the message can indicate that the triggering device is incorrectly wired, and the message can, in some embodiments, identify which wiring, connections, and/or neighbor device(s) are incorrect. This message can be sent, by the server, to the administrator device 122.

Returning again to decision step 512, if it is determined that the device identifying information is not associated with a configuration file, then the process 500 proceeds to block 524, wherein neighbor information is received from the triggering device. In some embodiments, this neighbor information can be received in the definition file received in block 506, and in some embodiments, this neighbor information can be received via a separate message. At block 526, a potential network profile, or in other words, a potential location of the triggering device in the computing network 102, is determined based on neighbor information received in block 524. In some embodiments, this can include identifying the closest match between the neighbor devices of the triggering device as identified in the neighbor information received in block 524 and expected neighbors of triggering devices as identified in the network map of the network database.

Once a potential network profile has been identified for the triggering device, the process 500 proceeds to block 528, wherein a percent of mismatched neighbors for the triggering device and that network profile is identified. In some embodiments, this can include determining the number of neighbors identified in the neighbor information received in block 524 that do not match the neighbor devices identified in the network map information of the potential network profile and the percent of the total neighbors of the triggering device representing those mismatches. The percent of mismatched neighbors can be compared to an accuracy threshold. This threshold can be, for example, 10% incorrect, 20% incorrect, 30% incorrect, 40% incorrect, 50% incorrect, or any other or intermediate percent. If it is determined that the accuracy threshold is not met, then the process 500 proceeds to block 532, wherein a message is generated and sent indicating that the system 100, and specifically the server 116 is unable to provision and/or configure the device. In some embodiments, this message can be sent by the server 116 to the administrator device 122.

Returning again to decision step 530, if it is determined that the accuracy threshold is met, then the process 500 proceeds to block 534, wherein the configuration file associated with the potential network profile is selected and delivered. In some embodiments this results in the provisioning of the triggering device via the delivery and/or downloading of the selected configuration file to the triggering device. In some embodiments, the selected configuration file can be delivered and/or downloaded to the triggering device by the server 116, by the ZTP server 118, by the memory 124, and/or by the configuration database 406. The process then proceeds to block 522, and proceeds as outlined above.

Example Implementation

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
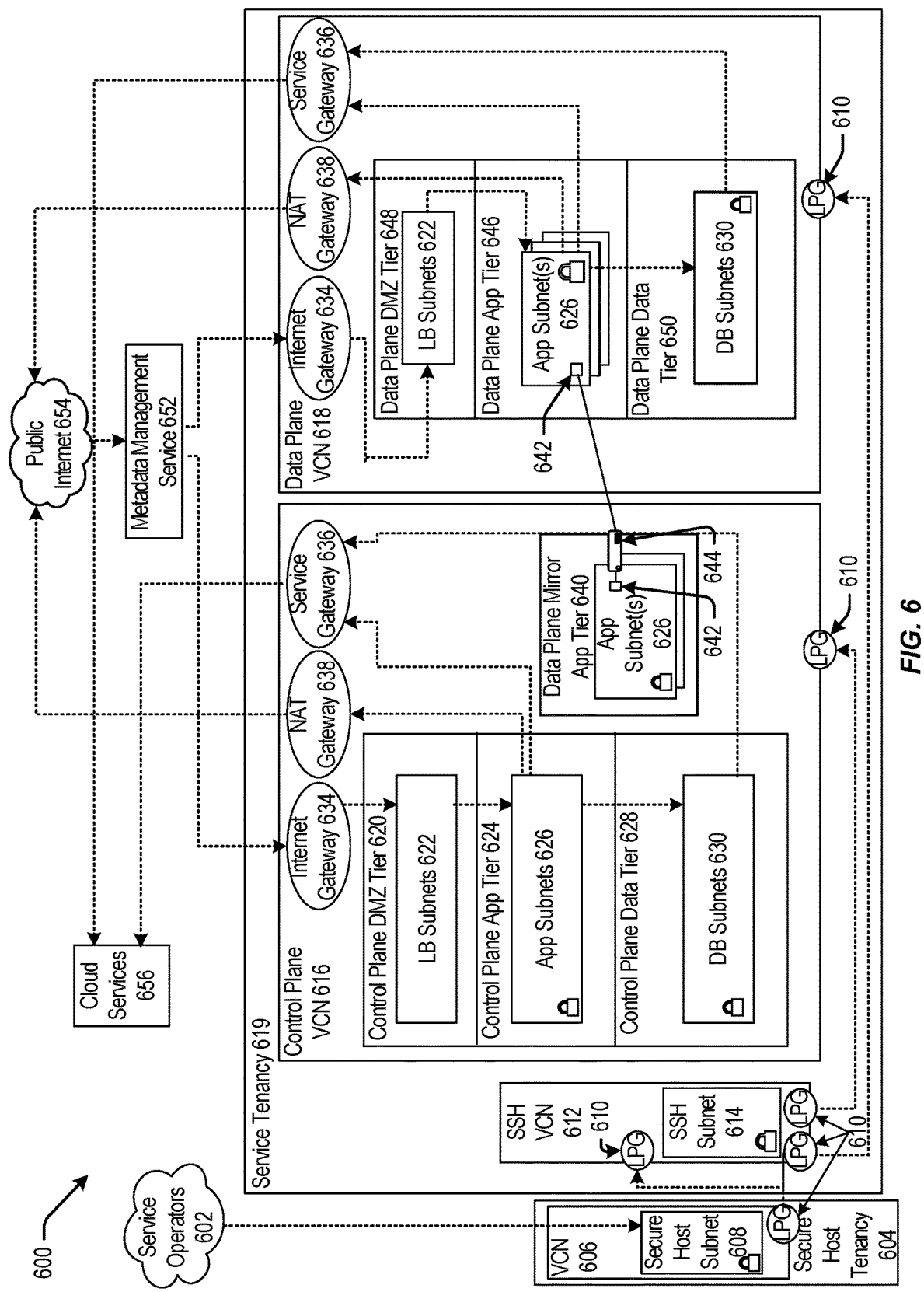
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
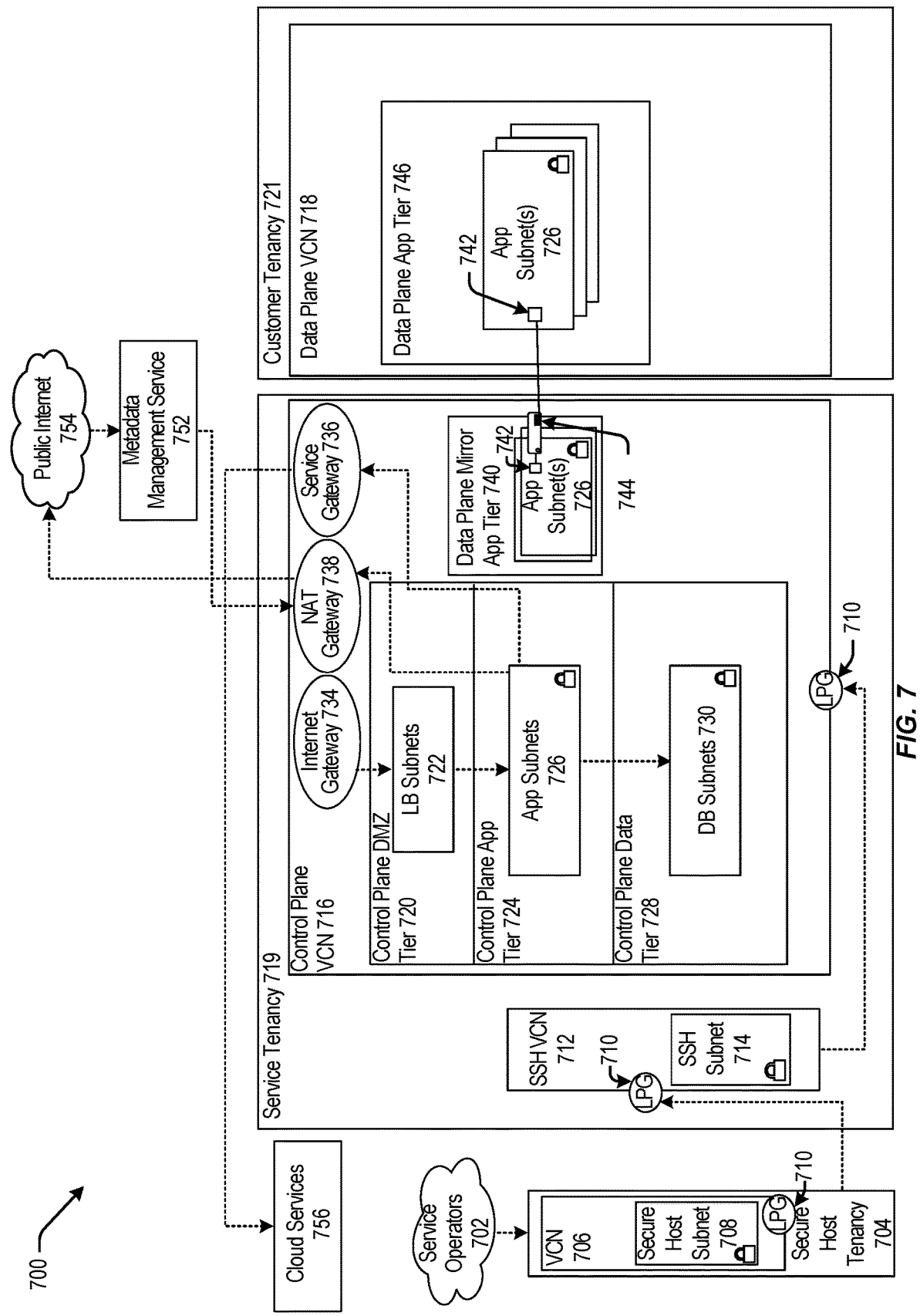
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726726. The app subnet(s) 726726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726726 of the data plane mirror app tier 740 and the app subnet(s) 726726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 1," may be located in Region 1 and in "Region 2." If a call to Deployment 1 is made by the service gateway 736 contained in the control plane VCN 716 located in Region 1, the call may be transmitted to Deployment 1 in Region 1. In this example, the control plane VCN 716, or Deployment 1 in Region 1, may not be communicatively coupled to, or otherwise in communication with, Deployment 1 in Region 2.

Figure 8:
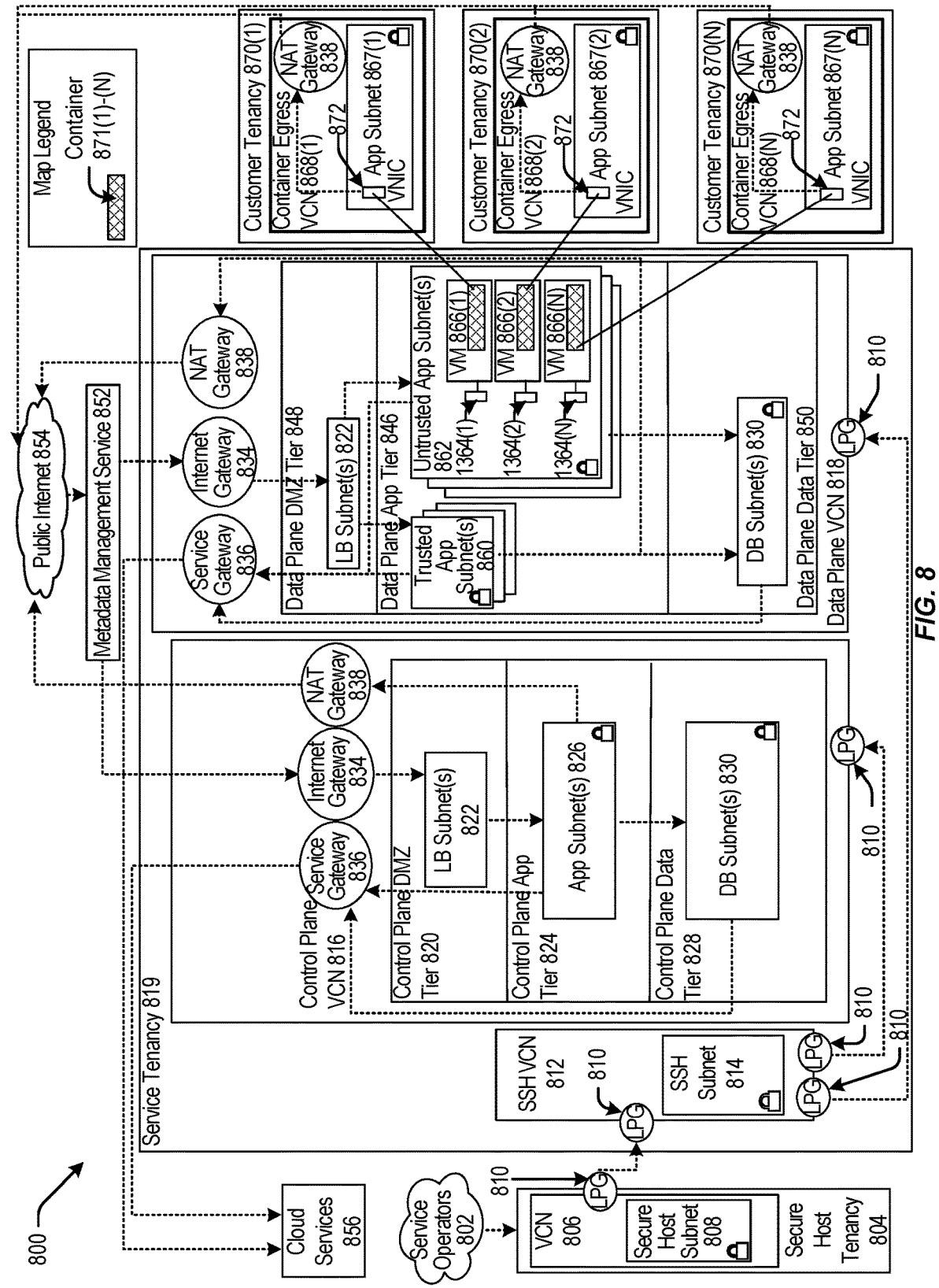
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
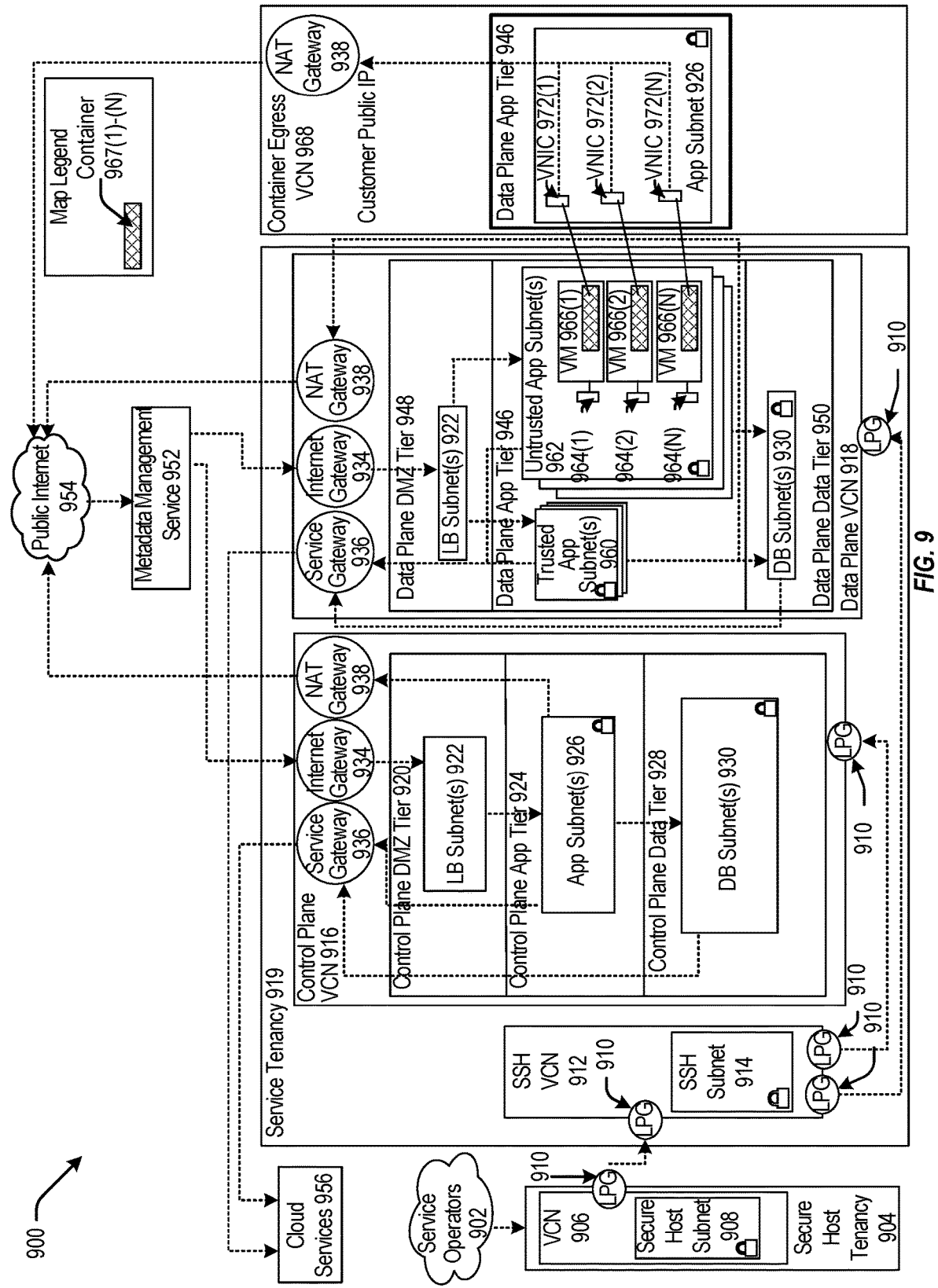
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
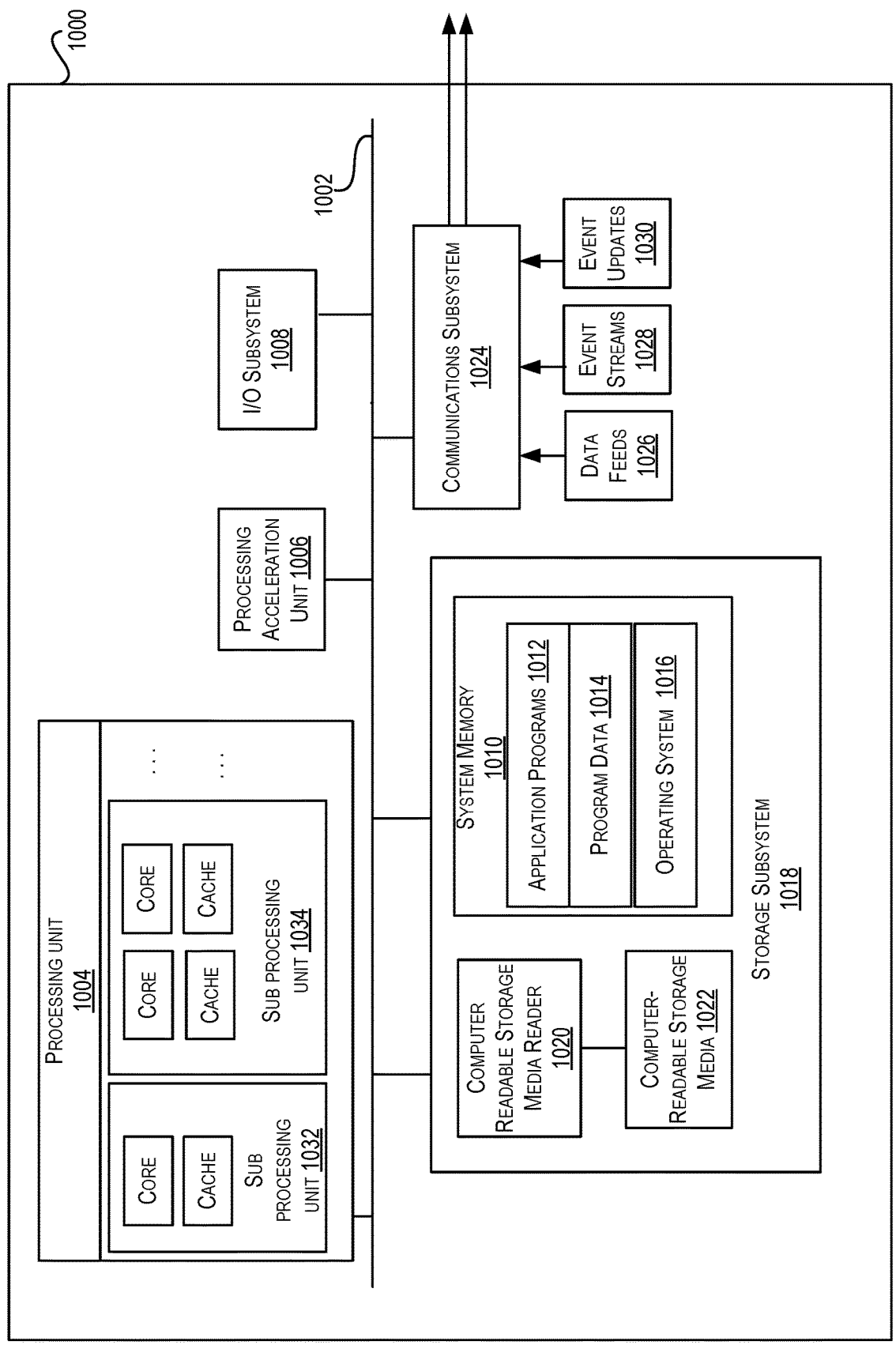
FIG. 10 is a block diagram illustrating an example computer system, according to at least one embodiment.

FIG. 10 illustrates an example computer system 1000, in which various embodiments of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
receiving, by a server, a trigger signal from a triggering device coupled to a data center hardware network, the triggering device comprising an unprovisioned component within the data center hardware network;
transmitting, by the server, an executable script to the triggering device, the executable script configured to instruct the triggering device to generate a definition file comprising a unique identifier of the triggering device;
receiving, by the server, the definition file from the triggering device;
determining that the triggering device is correctly wired;
identifying, by the server, a configuration file associated with the triggering device based at least in part on the unique identifier; and
provisioning the triggering device by delivering, by the server, the configuration file to the triggering device.

2. The method of claim 1, wherein the data center hardware network comprises a Clos network.

3. The method of claim 1, wherein the data center hardware network comprises a spine-and-leaf architecture.

4. The method of claim 1, wherein the unique identifier of the triggering device comprises a serial number.

5. The method of claim 1, wherein the executable script is configured to instruct the triggering device to identify neighboring devices.

6. The method of claim 5, wherein the definition file further comprises information identifying neighboring devices of the triggering device.

7. The method of claim 6, wherein the information identifying neighboring devices of the triggering device comprises at least one of: a serial number of a neighboring device; and wiring port information.

8. The method of claim 1, wherein determining that the triggering device is correctly wired comprises: comparing the identified neighboring devices to a set of expected neighboring devices for the triggering device; and identifying the triggering device as properly wired when the identified neighboring devices match the set of expected neighboring devices.

9. The method of claim 8, further comprising delivering a message indicating that the triggering device is correctly wired.

10. The method of claim 1, wherein the trigger signal received from the triggering device comprises a request for a network address, wherein the request for the network address is received by the server.

11. The method of claim 10, wherein the server comprises a Dynamic Host Configuration Protocol ("DHCP") server, and wherein the DHCP server receives the request for the network address.

12. The method of claim 11, wherein transmitting by the server the executable script to the triggering device comprises: allocating a network address for the triggering device; and providing the allocated network address to the triggering device.

13. A method, comprising:
receiving, by a server, a trigger signal from a triggering device coupled to a data center hardware network, the triggering device comprising an unprovisioned component within the data center hardware network;
transmitting, by the server, an executable script to the triggering device, the executable script configured to instruct the triggering device to generate a definition file comprising a unique identifier of the triggering device;
receiving, by the server, the definition file from the triggering device;
determining that the triggering device is incorrectly wired;
identifying, by the server, a configuration file associated with the triggering device based at least in part on the unique identifier; and
provisioning the triggering device by delivering, by the server, the configuration file to the triggering device.

14. The method of claim 13, wherein determining that the triggering device is incorrectly wired comprises: comparing the identified neighboring devices to a set of expected neighboring devices for the triggering device; and identifying the triggering device as improperly wired when at least one of the identified neighboring devices does not match the set of expected neighboring devices.

15. The method of claim 14, further comprising delivering a message indicating that the triggering device is incorrectly wired.

16. A non-transitory computer-readable storage medium storing a plurality of instructions executable by one or more processors, the plurality of instructions when executed by the one or more processors cause the one or more processors to:
receive a trigger signal from a triggering device coupled to a data center hardware network, the triggering device comprising an unprovisioned component within the data center hardware network;
transmit an executable script to the triggering device, the executable script configured to instruct the triggering device to generate a definition file comprising a unique identifier of the triggering device;
receive the definition file from the triggering device;
determine that the triggering device is correctly wired;
identify a configuration file associated with the triggering device based at least in part on the unique identifier; and
provision the triggering device by delivering the configuration file to the triggering device.

17. The non-transitory computer-readable storage medium storing a plurality of instructions executable by one or more processors of claim 16, wherein identifying the configuration file associated with the triggering device based at least in part on the unique identifier comprises: querying a database for the configuration file designated for the triggering device, wherein the database links: a device unique identifier to a location and to a configuration file; and returning the configuration file in response to the query of the database.

18. A system comprising:
a data center hardware network comprising at least one switch; and
at least one server communicatively coupled with the data center hardware network, wherein the at least one server is configured to:
  receive a trigger signal from a triggering device coupled to a data center hardware network, the triggering device comprising an unprovisioned component within the data center hardware network;
  transmit an executable script to the triggering device, the executable script configured to instruct the triggering device to generate a definition file comprising a unique identifier of the triggering device;
  receive the definition file from the triggering device;
  determine that the triggering device is correctly wired;
  identify a configuration file associated with the triggering device based at least in part on the unique identifier; and
  provision the triggering device by delivering the configuration file to the triggering device.

19. The system of claim 18, wherein the executable script is configured to instruct the triggering device to identify neighboring devices, and wherein the definition file further comprises information identifying neighboring devices of the triggering device.

20. A non-transitory computer-readable storage medium storing a plurality of instructions executable by one or more processors, the plurality of instructions when executed by the one or more processors cause the one or more processors to:
  receive a trigger signal from a triggering device coupled to a data center hardware network, the triggering device comprising an unprovisioned component within the data center hardware network;
  transmit an executable script to the triggering device, the executable script configured to instruct the triggering device to generate a definition file comprising a unique identifier of the triggering device;
  receive the definition file from the triggering device;
  determine that the triggering device is incorrectly wired;
  identify a configuration file associated with the triggering device based at least in part on the unique identifier; and
  provision the triggering device by delivering the configuration file to the triggering device.

21. A system comprising:
a data center hardware network comprising at least one switch; and
at least one server communicatively coupled with the data center hardware network, wherein the at least one server is configured to:
  receive a trigger signal from a triggering device coupled to a data center hardware network, the triggering device comprising an unprovisioned component within the data center hardware network;
  transmit an executable script to the triggering device, the executable script configured to instruct the triggering device to generate a definition file comprising a unique identifier of the triggering device;
  receive the definition file from the triggering device;
  determine that the triggering device is incorrectly wired;
  identify a configuration file associated with the triggering device based at least in part on the unique identifier; and
provision the triggering device by delivering the configuration file to the triggering device.

* * * * *